(12) United States Patent
Tuttle

(10) Patent No.: US 10,774,473 B2
(45) Date of Patent: Sep. 15, 2020

(54) COMPOSITIONS AND METHODS WITH MICROFIBRILLATED CELLULOSE FOR WALLBOARD PAPER

(71) Applicant: United States Gypsum Company, Chicago, IL (US)

(72) Inventor: Lori Tuttle, Orland Park, IL (US)

(73) Assignee: UNITED STATES GYPSUM COMPANY, Chicago, IL (US)

(*) Notice: Subject to any disclaimer, the term of this patent is extended or adjusted under 35 U.S.C. 154(b) by 158 days.

(21) Appl. No.: 15/968,439

(22) Filed: May 1, 2018

(65) Prior Publication Data

US 2018/0340297 A1 Nov. 29, 2018

Related U.S. Application Data

(60) Provisional application No. 62/511,560, filed on May 26, 2017.

(51) Int. Cl.
| | | |
|---|---|---|
| D21H 11/18 | (2006.01) | |
| D21H 27/38 | (2006.01) | |
| E04C 2/04 | (2006.01) | |
| B32B 13/08 | (2006.01) | |
| D21H 27/18 | (2006.01) | |
| D21H 27/30 | (2006.01) | |

(52) U.S. Cl.
CPC ............ *D21H 11/18* (2013.01); *B32B 13/08* (2013.01); *D21H 27/18* (2013.01); *D21H 27/30* (2013.01); *D21H 27/38* (2013.01); *E04C 2/043* (2013.01); *B32B 2250/03* (2013.01); *B32B 2250/40* (2013.01); *B32B 2307/54* (2013.01); *B32B 2607/00* (2013.01)

(58) Field of Classification Search
None
See application file for complete search history.

(56) References Cited

U.S. PATENT DOCUMENTS

| | | | |
|---|---|---|---|
| 2,806,811 A | * | 9/1957 | Von Hazmburg ...... C04B 28/14 428/530 |
| 4,374,702 A | | 2/1983 | Turbak et al. |
| 4,853,085 A | | 8/1989 | Johnstone et al. |
| 4,959,272 A | | 9/1990 | Long |
| 5,945,198 A | | 8/1999 | Deodhar et al. |

(Continued)

FOREIGN PATENT DOCUMENTS

| | | |
|---|---|---|
| WO | WO8803871 A1 | 6/1988 |
| WO | WO2014091413 A1 | 6/2014 |

OTHER PUBLICATIONS

Tappi, Tensile properties of paper and paperboard (using constant rate of elongation apparatus) (Revision of T 494 om-01), Jun. 13, 2006, pp. 1-28.

(Continued)

*Primary Examiner* — Chinessa T. Golden
(74) *Attorney, Agent, or Firm* — Greer, Burns & Crain, Ltd.; Philip T. Petti; Pradip Sahu

(57) ABSTRACT

A wallboard panel which comprises a paper cover sheet comprising microfibrillated cellulose (MFC). A paper cover sheet comprising MFC. A paper stock composition comprising MFC and methods for making a multi-ply paper cover sheet comprising MFC. Methods for making a wallboard panel comprising a paper cover sheet comprising MFC.

15 Claims, 1 Drawing Sheet

(56) References Cited

U.S. PATENT DOCUMENTS

| | | | |
|---|---|---|---|
| 6,153,040 A * | 11/2000 | Rohlf | B32B 13/08 |
| | | | 156/278 |
| 6,494,609 B1 | 12/2002 | Wittbold et al. | |
| 6,986,812 B2 | 1/2006 | Dubey et al. | |
| 7,572,329 B2 | 8/2009 | Liu et al. | |
| 8,617,718 B2 * | 12/2013 | Rohlf | B32B 13/08 |
| | | | 428/292.4 |
| 2009/0186549 A1 | 7/2009 | Bennett | |
| 2015/0114581 A1 * | 4/2015 | Kinnunen | D21H 11/18 |
| | | | 162/125 |
| 2015/0315747 A1 * | 11/2015 | Heiskanen | D21H 11/18 |
| | | | 162/181.2 |
| 2016/0102018 A1 * | 4/2016 | Dorris | B32B 13/02 |
| | | | 428/116 |

OTHER PUBLICATIONS

Tappit 460, SGS-IPS Testing, Air resistant of paper (Curley method), https://ipstesting.com/find-a-test/tappi-test-methods/tappi-t-460, Apr. 16, 2018, pp. 1-3.

Fellers et al., "Evaluation of the Scott bond test method", Paper Physics, Nordic Pulp and Paper Research Journal, vol. 27, No. Feb. 2012, pp. 231-236.

* cited by examiner

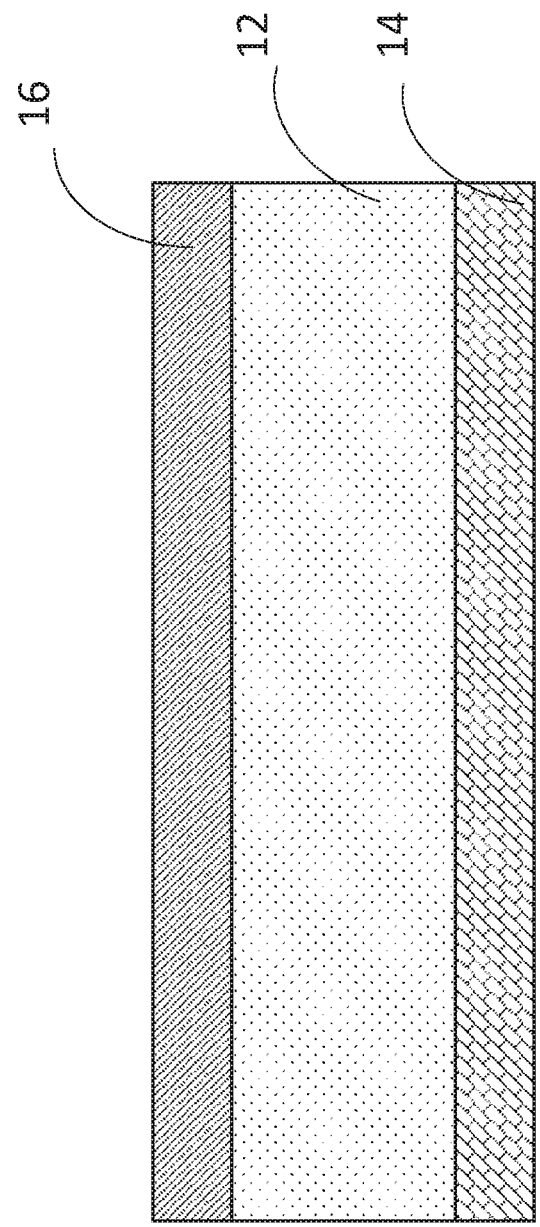

COMPOSITIONS AND METHODS WITH MICROFIBRILLATED CELLULOSE FOR WALLBOARD PAPER

CROSS-REFERENCE TO RELATED APPLICATIONS

This application claims the benefit of priority from U.S. provisional application 62/511,560, filed May 26, 2017, the entire disclosure of which is incorporated herein by reference.

TECHNICAL FIELD

This invention relates to wallboard paper comprising microfibrillated cellulose and wallboard in which paper comprising microfibrillated cellulose is used as a paper cover sheet.

BACKGROUND

Wallboard is a gypsum product widely used in building construction, including walls and partitions. Wallboard is typically manufactured by formulating a gypsum slurry in which calcined gypsum (calcium sulfate hemihydrate) is mixed with water and other ingredients. The gypsum slurry is then dispensed between two cover sheets of paper on a wallboard production line. The gypsum slurry is then allowed to set and forms a gypsum core between cover sheets. Processes for manufacturing wallboard are described in U.S. Pat. Nos. 6,494,609 and 6,986,812, both assigned to the United States Gypsum Company.

A wallboard panel has two long surfaces, one of the long surfaces is referred to as a back side and the other long surface is referred to as a face side. After installation is completed, the face side of the wallboard panel can be decorated, for example by painting and/or applying wallpaper. As described in U.S. Pat. No. 4,959,272, assigned to the United States Gypsum Company, two different types of paper are used as cover sheets for a wallboard panel. The first type of paper is used as a paper cover sheet which is used on the back side of the wallboard. This paper is formed from recycled wastepaper having many contaminants and it has a dark color.

The second type of paper is used on the face side of the wallboard. This is the side that will be decorated after installation. This second type of paper is typically a multi-ply sheet with 2 to 7 filler plies comprised of clean waste paper furnishes such as Kraft and boxboard cuttings of a hard stock nature and 1 to 2 top liner plies consisting of mainly flyleaf shavings and newspapers of a soft, typically mechanical pulp quality used to provide a light, manila colored smooth appearance on the face surface of the gypsum wallboard. The flyleaf shavings waste paper grade can be described as baled trim of magazines, catalogs and similar printed and unprinted material. It contains mechanical and chemical pulp fibers, but may also contain as much as 10-40 percent of clays and pigments from fillers and/or coating overlays.

As described in U.S. Pat. No. 5,945,198 assigned to the United States Gypsum Company, in order to provide a light, manila colored, smooth appearance on the exposed or decorated side, 1 to 2 top liner plies are included, covering the filler plies. This product is known as Manila or gypsum wallboard face paper. The top liner plies of Manila (manila face plies) consist mainly of soft stock furnishes such as flyleaf shavings and newspaper. A light-colored finish is desirable for the face paper because it may be covered with relatively few coats of paint without the risk of the underlying color "bleeding" through the paint. The flyleaf shavings can be described as baled trim of magazines, catalogs and similar printed and unprinted material. Containing primarily mechanical and chemical pulp fibers, but may also contain as much as 10-40 percent of clays and pigments from fillers and/or coating overlays.

Furnish components of the 1 to 2 top liner plies which are used to provide a suitable light colored, smooth face appearance are generally formed of 70-80% by weight of flyleaf furnish, old magazine and trim, and 30-20% waste newsprint. These top liner plies are inherently weak in strength. The high proportions of inert clays and fillers contained in the flyleaf shavings stock constituent further subtract from the strength of the liner plies. Moreover, the soft stocks and clays contained in the manila top liner plies are noted for poor dewatering, slow drainage, and drying.

Various attempts have been made to strengthen plies and especially top liner plies in a manila paper cover sheet. U.S. Pat. No. 4,959,272 assigned to the United States Gypsum Company, provides a paper cover sheet for gypsum wallboard which does not require the use of top liner plies. Instead, a coating composed of a light colored mineral filler and a binder is applied to an exposed surface of the cover sheet. Another method is provided by U.S. Pat. No. 5,945,198 assigned to the United States Gypsum Company, which provides a soy protein coating which can be applied over a paper sheet. However, applying various coatings over a paper cover sheet may increase the time needed for paper production. It may also affect painting and other decorative approaches.

Wallboard must meet ASTM standard requirements for compressive stress, flexural strength and other requirements. This presents a unique challenge with respect to paper that can be used in cover sheets for wallboard panels. A multi-ply manila paper that meets the ASTM requirements in lightweight wallboard is heavier than typical wallboard paper. However, decreasing the weight of paper may render this paper no longer suitable as a cover sheet because the paper no longer meets the requirements for strength and flexibility. Thus, there still exists the need for improved formulations for wallboard paper.

SUMMARY

In one aspect, the present disclosure provides a wallboard panel comprising a paper cover sheet which comprises microfibrillated cellulose (MFC). The paper cover sheet may be a multi-ply paper cover sheet, and at least one of the plies in the paper cover sheet may comprise MFC. In some of wallboard panels, the paper cover sheet is a multi-ply paper cover sheet, and at least one of the plies in the paper cover sheet comprises MFC and other fibers, and the amount of MFC in the ply is 2-10% by dry weight of total fibers in the ply. In some of the wallboard panels, MFC is a material composed of nanosized cellulose fibrils with a diameter in the range from 4 nm to 100 nm. Any of the paper cover sheets which comprise MFC may further comprise recycled Kraft paper, recycled corrugated paper, virgin cellulose fibers, waste newsprint or any combination thereof.

In this disclosure, some wallboard panels comprise a paper cover sheet which is a multi-ply paper cover sheet which comprises at least one filler ply and at least one liner ply, and wherein the at least one filler ply and/or the at least one liner ply comprises MFC. At least some of the wallboard panels comprise a paper cover sheet which is a manila paper cover sheet comprising one or more filler plies containing MFC. Some wallboard panels comprise a paper cover sheet which comprises a liner ply, and the liner ply comprises MFC.

Some wallboard panels of this disclosure comprise a paper cover sheet which is a multi-ply paper and at least one paper ply in the multi-ply paper comprises MFC, and the amount of MFC in the paper ply is 2-10% by dry weight of total fibers in the ply.

Further aspects of this disclosure relate to a wallboard panel which comprises a cementitious core with a back side and a face side, wherein the paper cover sheet covers the face side and/or back side of the cementitious core.

In further aspects, the present disclosure provides a paper cover sheet for making a wallboard panel, the paper cover sheet comprises microfibrillated cellulose (MFC). In some of these embodiments, MFC is a material composed of nanosized cellulose fibrils with a diameter in the range from 4 nm to 100 nm.

The paper cover sheet may be a multi-ply paper cover sheet, and one or more paper plies may contain MFC. The paper cover sheet may be a multi-ply paper cover sheet which comprises at least one filler ply and at least one liner ply and wherein the at least one filler ply and/or the at least one liner ply comprises MFC.

In some embodiments, the paper cover sheet is a manila paper cover sheet comprising one or more filler plies containing MFC. In some embodiments, the paper cover sheet comprises a liner ply, and the liner ply comprises MFC.

In some embodiments, the paper cover sheet comprises one or more liner plies and one or more filler plies, and the filler plies comprise MFC.

The paper cover sheet may be a multi-ply paper and at least one paper ply may comprise MFC, and the amount of MFC in the paper ply may be 2-10% by dry weight of total fibers in the ply.

Further aspects of this disclosure include a method of making a wallboard paper cover sheet. The method comprises preparing a paper stock comprising MFC and forming a multi-ply paper with at least one ply comprising MFC.

Yet further aspects of this disclosure include a method of making a wallboard panel. In the method, a gypsum slurry is prepared and deposited on paper cover sheet comprising one or more plies containing MFC. A second paper cover sheet may be used to cover the gypsum slurry on the other side. The gypsum slurry is allowed to set. The second paper cover sheet may also comprise MFC.

Further aspects of this disclosure include a paper stock composition for a filler ply, the composition comprising Kraft clippings, waste newsprint and 2-10% of MFC by dry weight of total fibers in the composition.

BRIEF DESCRIPTION OF THE DRAWINGS

FIG. 1 is a cross-sectional view of a wallboard panel comprising a paper cover sheet which comprises microfibrillated cellulose.

DETAILED DESCRIPTION

In one aspect, a multi-ply paper cover sheet of the present disclosure comprises microfibrillated cellulose (MFC) in at least one of its plies. Suitable MFC includes a material composed of nanosized cellulose fibrils with a diameter in the range from 4 nanometers (nm) to 100 nm. Some other suitable MFC preparations comprise mostly of MFC fibrils with a diameter in the range from 5 nm to 30 nm. Suitable MFC includes a material composed of nanosized cellulose fibrils of 5 microns (μm) to 100 microns (μm) in length. Suitable MFC includes a material composed of nanosized cellulose fibrils of 5 microns to 100 microns in length, and with a diameter in a range from 4 nm to 100 nm.

Various sources of cellulose which is a naturally occurring polysaccharide polymer can be used for obtaining MFC, including cellulose obtained from vascular plants. A preferred source of cellulose for obtaining suitable MFC is a wood pulp.

MFC can be obtained according to U.S. Pat. No. 4,374,702, by passing a liquid suspension of cellulose fibers through a homogenizer such as a small diameter orifice in which the suspension is subjected to a pressure drop of at least 3000 psig and a high velocity shearing. The process tears cellulose fibers and separates them into fibrils.

Other methods can be used for obtaining MFC suitable for production of multi-ply paper cover sheets. These methods include various homogenization methods such high pressure, high temperature and/or high velocity impact homogenization. Other suitable methods include refining, grinding or microfluidization. In some embodiments, a wood pulp can be enzymatically or chemically pre-treated prior to homogenization.

In one aspect, MFC is added to a paper stock from which paper plies will be formed. MFC can be added to a paper stock for at least one filler ply and/or for at least one liner ply. In particular, the use of MFC is preferred in production of filler and liner plies, including manila face plies. MFC can be used in various amounts. In some embodiments, MFC is used in an amount from 2 to 10% by dry weight of the fiber total in a paper stock. The rest of fibers in the paper stock can be a virgin wood pulp and/or recycled fibers. For example, 2 to 10 grams of MFC may be used in a formulation which comprises 100 grams of dry fibers in total, including MFC.

In some embodiments, MFC can be added to a paper stock for a top liner ply (manila face plies) which consists mainly of soft stock furnishes such as flyleaf shavings and newspaper. Other formulations to which MFC can be added may include stocks comprising fibers from recycled Kraft paper, recycled corrugated paper, virgin cellulose fibers and/or waste newsprint.

In some embodiments, the amount of total fibers in a paper stock can be decreased at least by the amount of MFC added. This allows to decrease the weight of paper, such as manila paper, made from a paper stock. Surprisingly, manila paper comprising MFC is stronger and more elastic than conventional manila paper which does not comprise MFC. The manila paper comprising MFC retains a good porosity. This paper is light-weight and has a surface suitable for painting or vinyl coating. The manila paper comprising MFC is sufficiently porous to prevent delamination of a cover sheet from a gypsum core.

In addition to fibers, the paper stock comprises water. It may also comprise a sizing agent and/or a buffer and/or other additives. Specific examples of a sizing agent include iso-octadecenyl succinic acid anhydride, n-hexadecenyl succinic acid anhydride, dodecenyl succinic acid anhydride, dodecyl succinic acid anhydride, decenyl succinic acid anhydride, octenyl succinic acid anhydride, nonenyl succinic acid anhydride, triisobutenyl succinic acid anhydride, caproyloxy succinic acid anhydride, heptyl glutaric acid anhydride, and benzyloxy succinic acid anhydride, as provided in U.S. Pat. No. 4,853,085. Other sizing agents may be used as well. Various additives may be used in a paper stock that improve solubilization of a sizing agent and its adhesion to fibers. Such additives include, but are not limited to, alum, aluminum chloride, long chain fatty amines, sodium aluminate, thermosetting resins and polyamide polymers and various cationic starch derivatives including primary, secondary, tertiary or quaternary amine starch derivatives, as provided in U.S. Pat. No. 4,853,085.

In some embodiments, MFC is used for making at least one ply in a multi-ply paper which is used as a paper cover sheet for the face side of a wallboard panel. In some embodiments, this face paper cover sheet comprises at least one filler ply and at least one liner ply. MFC can be added into a paper stock for either the filler ply, or the liner ply, or into a stock for both filler and liner plies.

In some embodiment, a paper cover sheet for the face side of a wallboard panel comprises from 2 to 7 filler plies and 1 to 2 liner plies. In these embodiments, MFC is added into a paper stock for at least one of filler ply, at least two filler plies, at least three filler plies, at least four filler plies, at least five filler plies, at least 6 filler plies, or at least 7 filler plies. In other embodiments, MFC is added into a paper stock for at least one liner ply in addition to or instead of at least one filler ply. Table 1 provides some compositions of fibers in a paper stock for a liner ply according to the present disclosure.

TABLE 1

| Fibers | Amount by dry weight of fibers in total |
| --- | --- |
| Flyleaf furnish | 60-80% |
| Waste newsprint | 38-10% |
| MFC | 2%-10% |

Table 2 provides some compositions of fibers in a paper stock for a filler ply according to the present disclosure.

TABLE 2

| Fibers | Amount by dry weight of fibers in total |
| --- | --- |
| Old Corrugated Containers (OCC) | 90-98% |
| MFC | 2-10% |

In one embodiment, a paper stock with fibers is prepared for a filler ply as provided in Table 2. A separate stock is prepared for a liner ply. The filler stock may comprise fibers from recycled Kraft paper and/or recycled corrugated paper. Other formulations for a filler ply can be used as well. A multi-ply paper is then prepared by pressing several plies together such that a liner ply is the most outer ply overlaying a filler ply. Various paper grades, including Manila paper, may be prepared by this method. A manila paper is typically utilized as the face paper of gypsum wallboard, which faces outwardly when the board is mounted on the stud frames. Typically, the manila paper consists of several, preferably 4 to 8, filler plies and one to two liner plies as the top layers facing outwardly when the board is mounted. The filler plies in the Manila paper comprise MFC may also contain one or more of the following fibers: Kraft clippings, waste newsprint or recycled corrugated paper. MFC may be used in an amount from 2% to 10% by dry weight of the fibers total, and preferably from 4% to 10% by dry weight of the fibers total. The liner plies may be prepared with or without MFC.

Other paper grades comprising MFC are also provided by this disclosure and include newslined, sheathing, paper for plaster application and water-resistant paper for high humidity applications. These paper grades may be prepared by adding MFC to paper stocks and then following conventional paper making protocols including those described in U.S. Pat. No. 4,853,085, assigned to the United States Gypsum Company. Paper stocks formulated with MFC may then be used for forming and pressing paper plies. Several plies formulated with MFC may be pressed together if a multi-ply paper sheet is to be produced. In further embodiments, paper plies comprising MFC may be pressed together with paper plies which do not comprise MFC in order to produce a multi-ply paper sheet. In some embodiments, some or all filler plies comprise MFC, and they are pressed together with at least one liner ply which does not comprise MFC in order to obtain a multi-ply paper sheet.

It will be appreciated that as used in this disclosure, the term a paper cover sheet comprising MFC includes multi-ply paper cover sheets and single-ply paper cover sheets. A paper cover sheet comprising MFC includes a multi-ply paper cover sheet in which at least some plies comprise MFC fibers. A paper cover sheet comprising MFC includes a multi-ply paper cover sheet in which at least one ply comprises MFC. A paper cover sheet comprising MFC includes a multi-ply paper cover sheet in which all plies comprise MFC. A paper cover sheet comprising MFC includes a multi-ply paper cover sheet in which at least some of filler plies comprise MFC. A paper cover sheet comprising MFC includes a multi-ply paper cover sheet in which all filler plies comprise MFC. A paper cover sheet comprising MFC includes a multi-ply paper cover sheet in which all plies comprise MFC. Any of the paper cover sheets also comprise other fibers typically used in a gypsum board paper cover sheet. Such other fibers include, but are not limited to, recycled Kraft paper, recycled corrugated paper, virgin cellulose fibers, waste newsprint or any combination thereof.

In further embodiments, the present disclosure provides wallboard prepared with paper cover sheets comprising MFC. Reference is made to FIG. 1 which is a cross-sectional view of a wallboard panel, generally (10). The wallboard panel (10) comprises a cementitious core (12) covered on the face side with a paper cover sheet comprising MFC (14). The cementitious core (12) may comprise gypsum and other additives, including, without limitations, any of the following: fibers, surfactants, organic and/or inorganic binders, dispersants, defoamers and/or biocides. In FIG. 1, only one cover sheet comprises MFC (14). The other cover sheet (16), which covers the back side of the cementitious core (12), does not comprise MFC. A person of skill will readily appreciate other embodiments (not shown) in which both cover sheets, the face cover sheet and the back cover sheet, may comprise at least one or more plies which comprise MFC. In further embodiments (not shown), a paper cover sheet comprising MFC covers the back side of the wallboard panel, while the front side is covered with a paper cover sheet which does not comprise MFC. In the embodiment of FIG. 1, the cover sheets are applied directly over the cementitious core. In other embodiments, a wallboard panel comprising a cementitious core covered with a paper cover sheet which comprises MFC may further comprise additional layer(s), coating(s) and/or component(s) located between the cover sheet and a gypsum core and/or such additional layer(s), coating(s) and/or component(s) may be applied over the external surface of the paper cover sheet.

According to the present disclosure, some wallboard panels comprise one paper cover sheet comprising MFC which covers a cementitious core on one of its two long surfaces. In other embodiments, a wallboard panel comprises a cementitious core which is covered on both of its long surfaces with a paper cover sheet comprising MFC.

In some embodiments a wallboard panel comprising at least one paper cover sheet comprising MFC may be prepared with a gypsum slurry which is prepared by mixing water with calcined gypsum and various additives, including as described in U.S. Pat. No. 7,572,329, assigned to the United States Gypsum Company.

In one of these method embodiments, a gypsum slurry is continuously deposited on a first paper cover sheet moving on a conveyer belt beneath a mixer. The first paper cover sheet comprises MFC. The first paper cover sheet is fed from a roll. A second paper cover sheet is applied over the gypsum slurry from a second roll. The second paper cover sheet may also comprise MFC in some embodiments. The resultant assembly is formed into the shape of a panel strip which is covered on both of each two long surfaces with a paper cover sheet. Once the panel strip sets and becomes firm, it may be cut to form wallboards of desired length. Typically, the wallboards are conveyed through a drying kiln to remove excess moisture.

Comparative Example 1—Nail-Pull Test for Wallboard with Paper Cover Sheets Comprising MFC MFC was added to the paper machine stock at 2%, 4% or 6%. The percentage is by dry weight of fibers total. The stocks were used to make paper cover sheets comprising MFC. Wallboard samples were prepared with the paper cover sheets comprising MFC. Control wallboard samples were prepared with conventional paper cover sheets which did not comprise MFC.

The wallboard samples were tested in the nail pull test B in accordance with ASTM C473-17. In this test, the ability of wallboard to resist nail pull-through is evaluated by determining a load required to push a standard nail head through the wallboard. Results of the nail-pull test are reported in Table 3 below.

TABLE 3

| Wallboard Sample | Nail-Pull Load |
| --- | --- |
| Control Wallboard with Paper Cover Sheet that does not comprise MFC | 1.93 lb nail pull/lb basis weight |
| Test Wallboard with Paper Cover Sheet that comprises 0-2% MFC by dry weight of fibers total | 1.96 lb nail pull/lb basis weight |
| Test Wallboard with Paper Cover Sheet that comprises 4-6% MFC by dry weight of fibers total | 2.11 lb nail pull/lb basis weight |

The test results in Table 3 support a conclusion that wallboard samples prepared with cover sheets comprising MFC show improvement in the nail-pull strength in comparison to control wallboard samples prepared with paper cover sheets that do not comprise MFC.

Comparative Example 2—Scott Bond Test for Wallboard with Paper Cover Sheets Comprising MFC Wallboard samples were prepared with cover sheets comprising 4-6% MFC by dry weight of fibers total, as described in comparative Example 1. Control wallboard samples were prepared with conventional paper cover sheets which did not comprise MFC.

TAPPI Method T-569, the Scott bond test, was used to evaluate the delamination resistance of paper board. As described in Fellers et al. 2012, in the Scott bond test, a right-angle L-shaped metal bracket is fastened to the surface of board by double-sided tape. Then the L-bracket is hit by a pendulum causing delamination in the test sample. The energy required to split the paper is estimated from the position reached by the pendulum after impacting the L-bracket.

Results of the Scott bond test are reported in Table 4 below.

TABLE 4

| Wallboard Sample | Energy |
| --- | --- |
| Control Wallboard with Paper Cover Sheet that does not comprise MFC | 130 j/m$^2$ |
| Test Wallboard with Paper Cover Sheet that comprises 4-6% MFC by dry weight of fibers total | 180 j/m$^2$ |

The test results in Table 4 support a conclusion that wallboard samples prepared with cover sheets comprising MFC show improvement in the delamination strength in comparison to control wallboard samples prepared with paper cover sheets that do not comprise MFC.

Comparative Example 3—Tensile Strength of Paper Cover Sheets Comprising MFC

TAPPI method T-494 was used to measure tensile strength of paper. As stated in section 3 of the TAPPI method T-494 description of Jun. 13, 2006, tensile strength is indicative of the strength derived from factors such as fiber strength, fiber length, and bonding. Tensile strength has been used as an indication of the serviceability of paper which is subjected to a direct tensile stress. The ability of paper to conform to a desired contour may be also evaluated by this test.

Table 5 reports results of tensile strength measurements for a paper cover sheet comprising MFC in comparison to control paper that does not comprises MFC.

TABLE 5

| | Control Paper - No MFC | Paper Comprising 4-6% MFC |
| --- | --- | --- |
| Tensile Index - Perpendicular to Machine direction (CD) | 0.68 lbf/in | 0.80 lbf/in |
| Tensile Index - Machine Direction (MD) | 1.6 lbf/in | 1.8 lbf/in |
| Elongation (Stretch) % CD | 4.2 | 5.2 |
| Elongation (Stretch) % MD | 5.2 | 5.8 |

The test results in Table 5 support a conclusion that cover sheets comprising MFC show improvement in elasticity in comparison to control paper cover sheets that do not comprise MFC.

Comparative Example 4—Porosity of Paper Cover Sheets Comprising MFC

TAPPI method T-460 om-02 was used to measure paper porosity. This method measures the amount of time required for a volume of air to pass through a test paper specimen.

Table 6 reports results of paper porosity measurements for a paper cover sheet comprising MFC in comparison to control paper that does not comprises MFC.

TABLE 6

|  | Control Paper - No MFC | Paper Comprising 4-6% MFC |
|---|---|---|
| Porosity (Gurley sec) | 10 | 35 |

The test results in Table 6 support a conclusion that cover sheets comprising MFC show a reduction in porosity in comparison to control paper cover sheets that do not comprise MFC.

What is claimed is:

1. A wallboard panel comprising a paper cover sheet, wherein the paper cover sheet is a multi-ply paper cover sheet, and at least one of the plies in the paper cover sheet comprises microfibrillated cellulose (MFC) and other fibers, and an amount of MFC in the ply is from 2% to 10% by dry weight of total fibers in the ply; and wherein the other fibers comprise one or more of the following: recycled Kraft paper, recycled corrugated paper, virgin cellulose fibers, waste newsprint or any combination thereof.

2. The wallboard panel of claim 1, wherein MFC is a material composed of nanosized cellulose fibrils with a diameter in the range from 4 nm to 100 nm.

3. The wallboard panel of claim 1, wherein the multi-ply paper cover sheet which comprises at least one filler ply and at least one liner ply, and wherein the at least one filler ply and/or the at least one liner ply are the plies which comprise MFC.

4. The wallboard panel of claim 1, wherein the paper cover sheet is a manila paper cover sheet comprising one or more filler plies and wherein the one or more filler plies are the plies containing MFC.

5. The wallboard panel of claim 1, wherein the paper cover sheet comprises a liner ply, and the liner ply is the ply which comprises MFC.

6. The wallboard panel of claim 1, wherein the wallboard panel comprises a cementitious core with a back side and a face side, wherein the paper cover sheet covers the face side and/or back side of the cementitious core.

7. A paper cover sheet for making a wallboard panel, the paper cover sheet comprising microfibrillated cellulose (MFC), wherein the paper cover sheet is a multi-ply paper cover sheet, and at least one of the plies in the paper cover sheet comprises microfibrillated cellulose (MFC) and other fibers, and an amount of MFC in the ply is from 2% to 10% by dry weight of total fibers in the ply; and wherein the other fibers comprise one or more of the following: recycled Kraft paper, recycled corrugated paper, virgin cellulose fibers, waste newsprint or any combination thereof.

8. The paper cover sheet of claim 7, wherein MFC is a material composed of nanosized cellulose fibrils with a diameter in the range from 4 nm to 100 nm.

9. The paper cover sheet of claim 7, wherein the paper cover sheet is a multi-ply paper cover sheet which comprises at least one filler ply and at least one liner ply and wherein the at least one filler ply and/or the at least one liner ply are the plies which comprise MFC.

10. The paper cover sheet of claim 7, wherein the paper cover sheet is a manila paper cover sheet comprising one or more filler plies and wherein the one or more filler plies are the one or more plies containing MFC.

11. The paper cover sheet of claim 7, wherein the paper cover sheet comprises one or more liner plies and one or more filler plies, and the filler plies are the plies which comprise MFC.

12. A filler ply paper stock composition, the composition comprising Kraft clippings, waste newsprint and 2-10% of microfibrillated cellulose (MFC) by dry weight of total fibers in the composition.

13. A method of making a wallboard paper cover sheet according to claim 1, the method comprising preparing a paper stock comprising MFC and forming a multi-ply paper with at least one ply comprising MFC.

14. A method of making a wallboard panel, the method comprising preparing a paper cover sheet according to the method of claim 13, preparing gypsum slurry and depositing the gypsum slurry on the paper cover sheet, optionally using a second paper cover sheet, and allowing the gypsum slurry to set.

15. The method of claim 14, wherein the second paper cover sheet comprises MFC.

* * * * *